United States Patent
Kanai

(10) Patent No.: US 12,133,315 B2
(45) Date of Patent: Oct. 29, 2024

(54) SNUBBER CIRCUIT, POWER SEMICONDUCTOR MODULE, AND INDUCTION HEATING POWER SUPPLY DEVICE

(71) Applicant: NETUREN CO., LTD., Tokyo (JP)

(72) Inventor: Takahiko Kanai, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 904 days.

(21) Appl. No.: 17/274,989

(22) PCT Filed: Sep. 4, 2019

(86) PCT No.: PCT/JP2019/034785
§ 371 (c)(1),
(2) Date: Mar. 10, 2021

(87) PCT Pub. No.: WO2020/054539
PCT Pub. Date: Mar. 19, 2020

(65) Prior Publication Data
US 2021/0400775 A1    Dec. 23, 2021

(30) Foreign Application Priority Data

Sep. 12, 2018  (JP) .................................. 2018-170803

(51) Int. Cl.
*H02M 7/00* (2006.01)
*H02M 1/34* (2007.01)
(Continued)

(52) U.S. Cl.
CPC .............. *H05B 6/06* (2013.01); *H02M 1/348* (2021.05); *H02M 7/003* (2013.01); *H02M 7/5387* (2013.01)

(58) Field of Classification Search
CPC .... H02M 1/348; H02M 7/003; H02M 7/5387; H05B 6/06
See application file for complete search history.

(56) References Cited

U.S. PATENT DOCUMENTS

| | | | |
|---|---|---|---|
| 2008/0043500 A1 | 2/2008 | Asano et al. | |
| 2016/0344279 A1* | 11/2016 | Kanda | .................. H02H 7/1225 |
| 2019/0206810 A1 | 7/2019 | Kanai et al. | |

FOREIGN PATENT DOCUMENTS

| | | |
|---|---|---|
| GB | 2 298 747 | 9/1996 |
| JP | 8-251908 | 9/1996 |

(Continued)

OTHER PUBLICATIONS

International Search Report and Written Opinion of the International Searching Authority, issued Oct. 24, 2019 in corresponding International Patent Application No. PCT/JP2019/034785.

*Primary Examiner* — Robert Grant
(74) *Attorney, Agent, or Firm* — Wenderoth, Lind & Ponack, L.L.P.

(57) ABSTRACT

A snubber circuit unit for a power semiconductor module including an arm having two power semiconductor elements capable of switching which are connected in series, the power semiconductor module including a positive DC input terminal, a negative input terminal, and an output terminal which are electrically connected to the arm, the positive DC input terminal, the negative DC input terminal, and the output terminal being provided on an upper surface opposite to an installation surface of the power semiconductor module, the snubber circuit unit includes a circuit board, and a plurality of electronic components mounted on the circuit board.

8 Claims, 6 Drawing Sheets

(51) Int. Cl.
*H02M 7/5387* (2007.01)
*H05B 6/06* (2006.01)

(56) References Cited

FOREIGN PATENT DOCUMENTS

| | | |
|---|---|---|
| JP | 9-64508 | 3/1997 |
| JP | 9-215343 | 8/1997 |
| JP | 2009-225612 | 10/2009 |
| JP | 2014-56684 | 3/2014 |
| JP | 2014-128066 | 7/2014 |
| JP | 2018-57139 | 4/2018 |
| WO | 2015/049736 | 4/2015 |

* cited by examiner

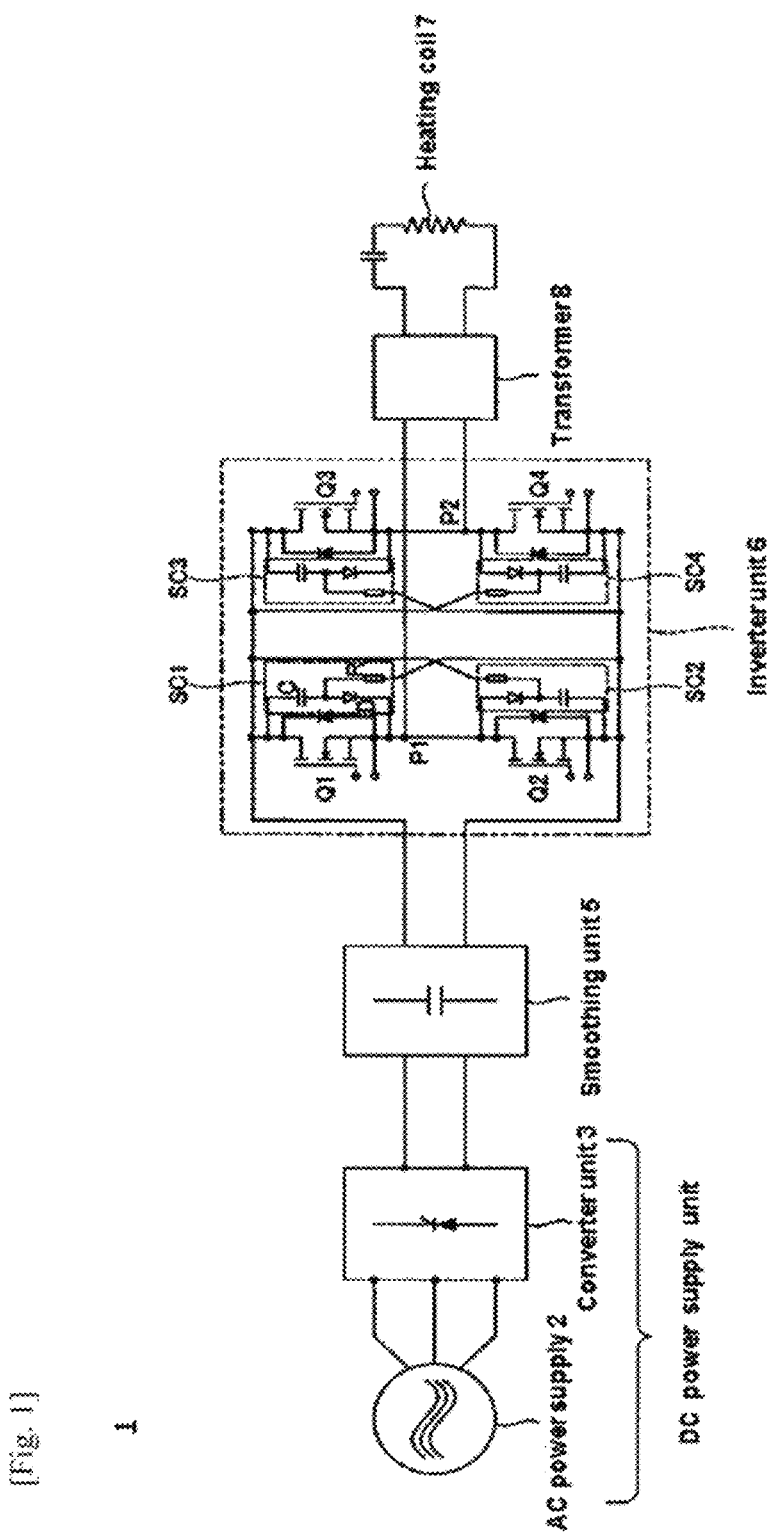
[Fig. 1]

[Fig. 2]
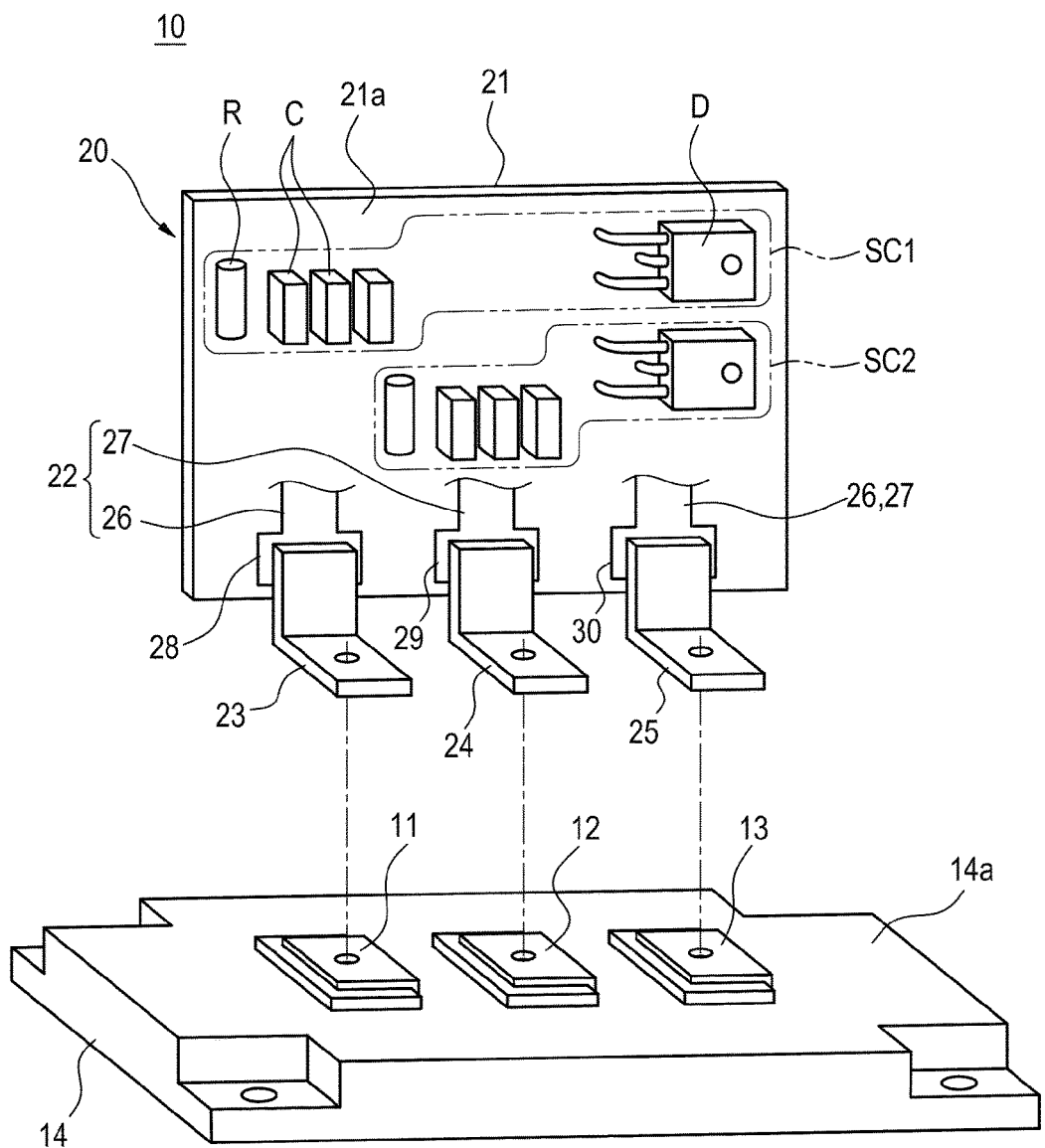

[Fig. 3]
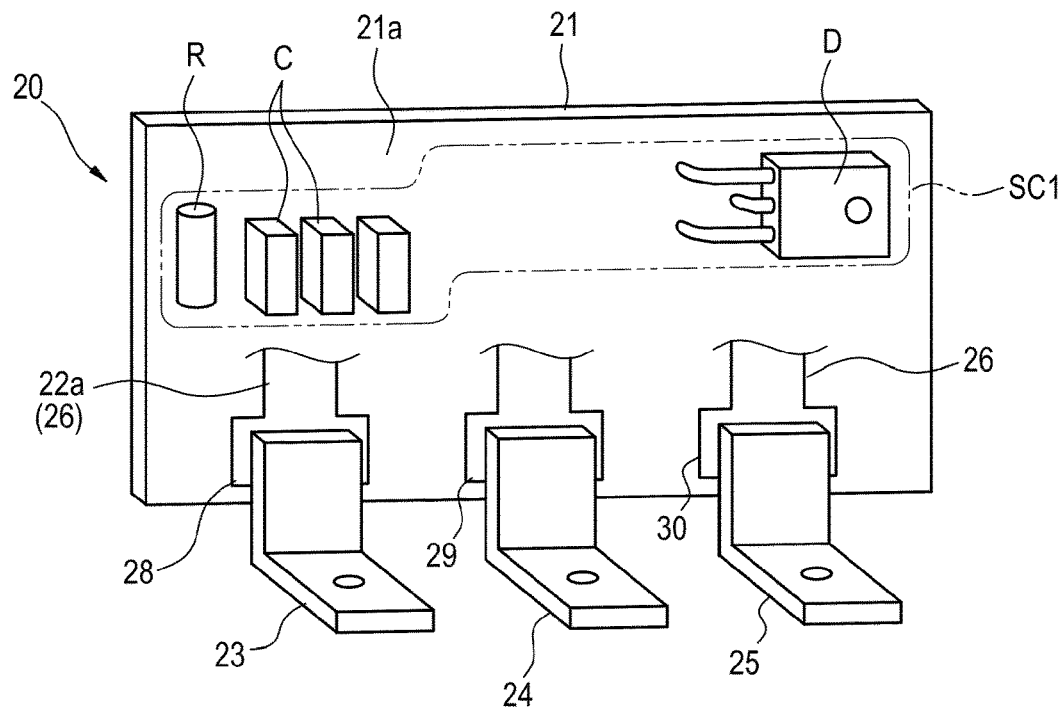
[Fig. 4]
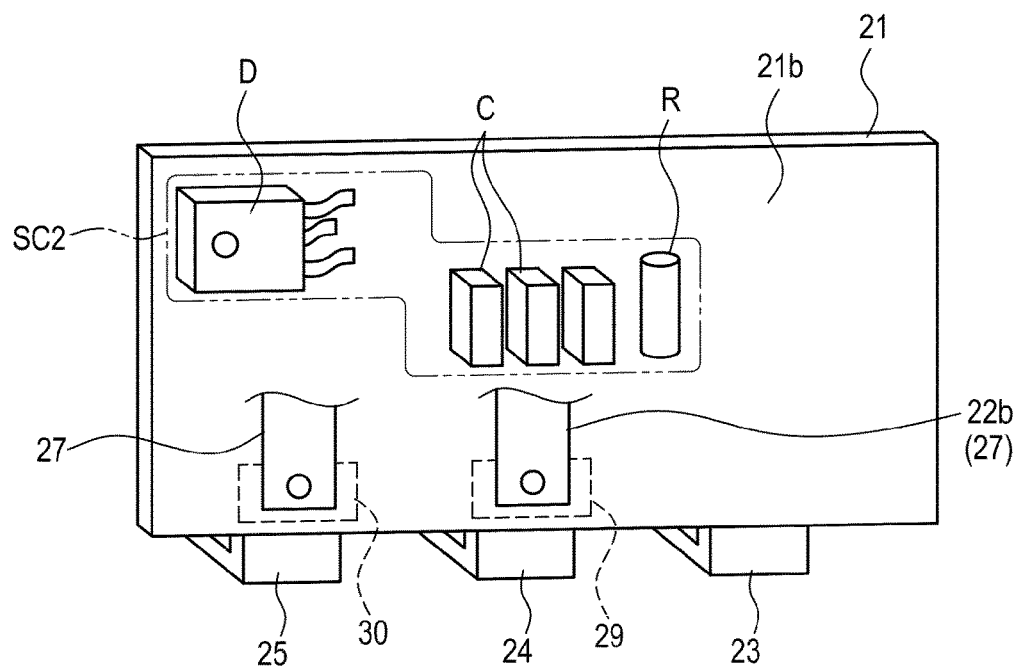

[Fig. 5]
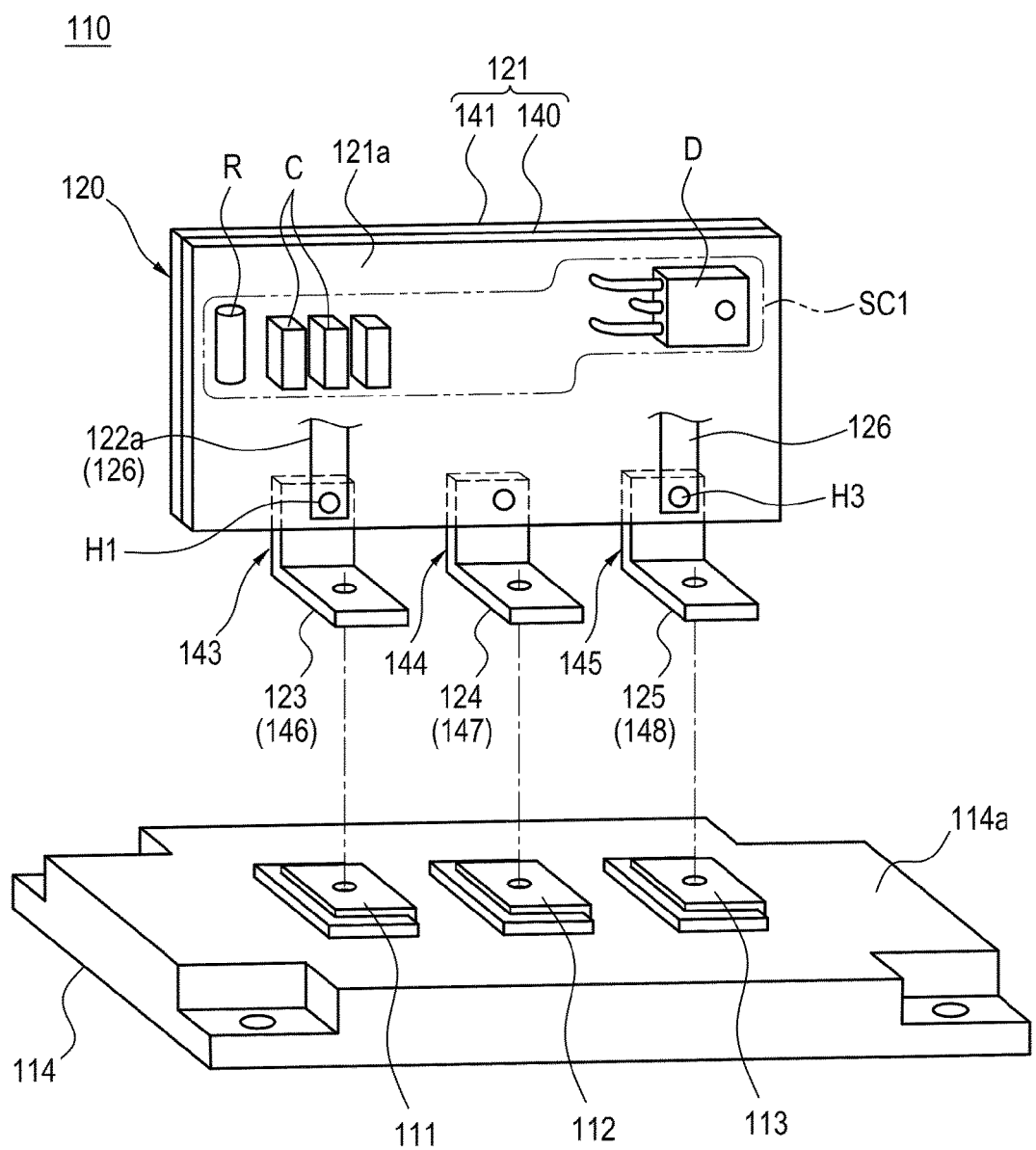

[Fig. 6]
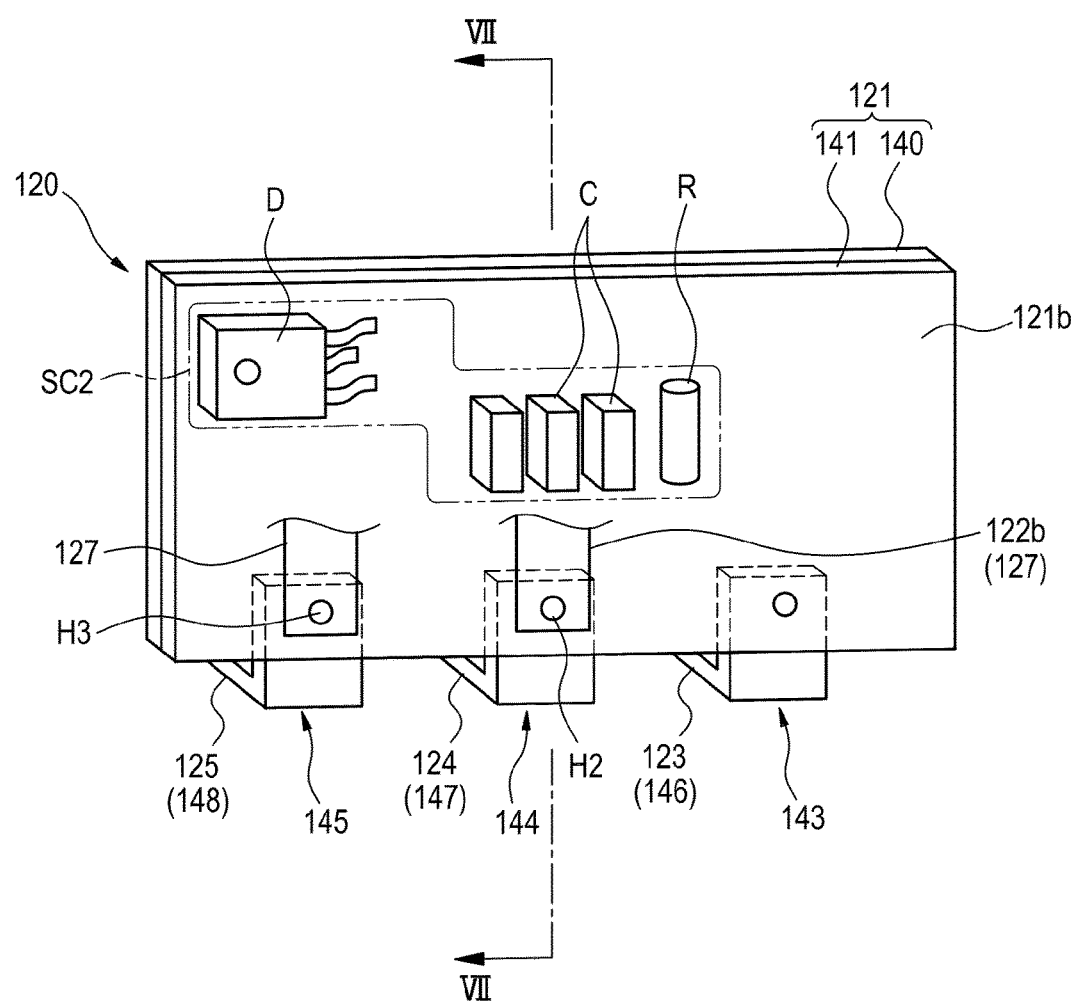

[Fig. 7]
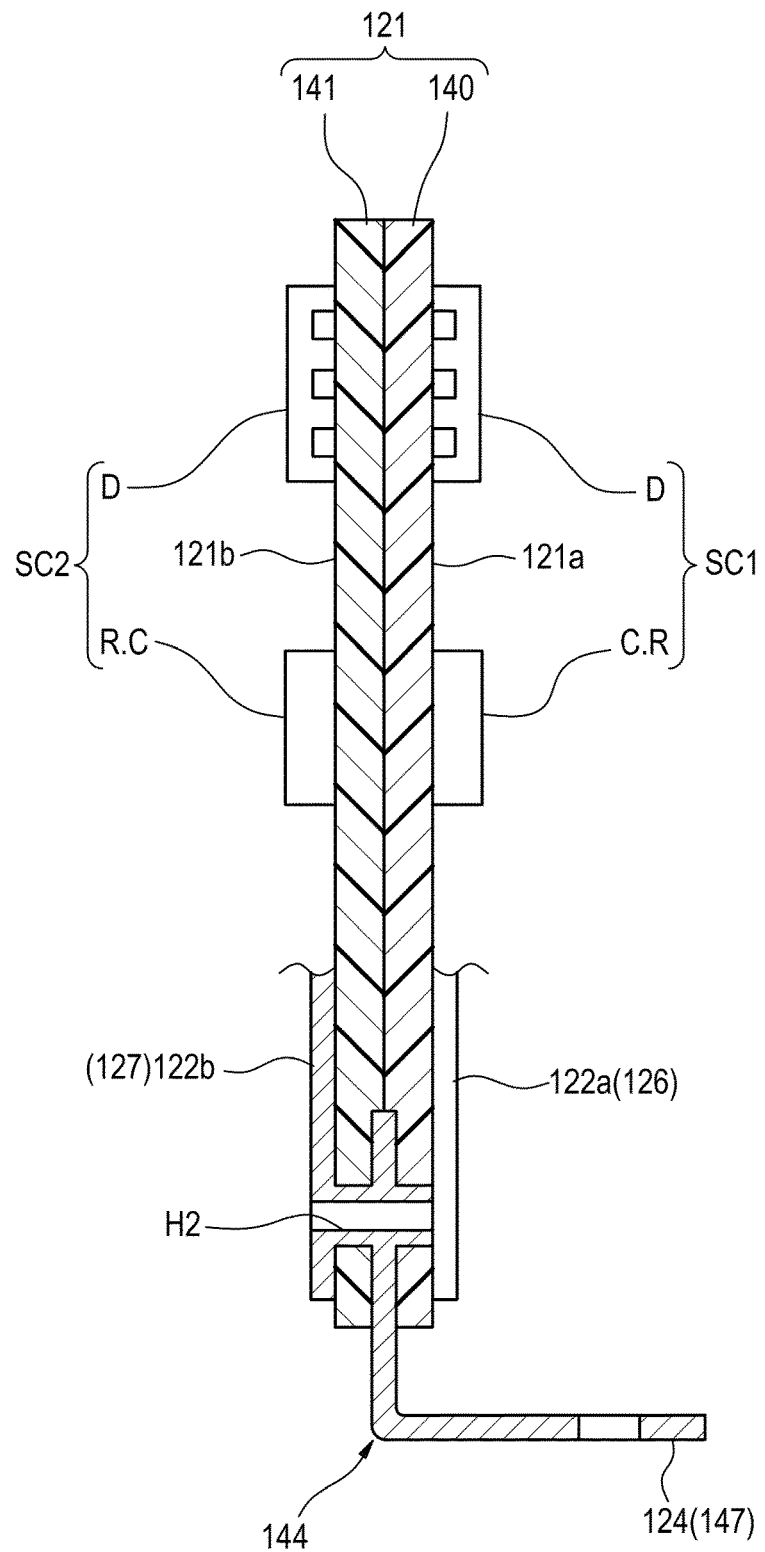

SNUBBER CIRCUIT, POWER SEMICONDUCTOR MODULE, AND INDUCTION HEATING POWER SUPPLY DEVICE

TECHNICAL FIELD

The present invention relates to a snubber circuit, a power semiconductor module, and an induction heating power supply device.

BACKGROUND ART

As a heating method of workpiece in heat treatment of a steel workpiece, induction heating, in which AC power is supplied to a heating coil and a workpiece placed in a magnetic field formed by the heating coil is heated by an induced current induced in the workpiece, is used. In general, a power supply device that supplies AC power to a heating coil converts AC power of a commercial power source into DC power, smoothes a pulsating flow of the DC power with a capacitor, and reversely converts the smoothed DC power into AC power with an inverter, so as to generate high-frequency AC power to be supplied to the heating coil.

In general, the inverter includes a bridge circuit including a plurality of arms, with two power semiconductor elements, which are serially connected in series and capable of switching, as one arm, and generates high-frequency AC power via high-speed switching of the power semiconductor elements. The plurality of arms constituting the bridge circuit are typically modularized individually.

As the power semiconductor module, one in which among a positive DC input terminal, a negative DC input terminal, and an output terminal, which are electrically connected to an arm, the positive DC input terminal and the negative DC input terminal are provided adjacent to each other on one side surface of the module, and the output terminal is provided on an opposite side surface of the module (see, for example, Patent Document 1) is known, and one in which a positive DC input terminal, a negative DC input terminal, and an output terminal are provided on an upper surface of the module (see, for example, Patent Document 2) is known.

[Patent Document 1] JP-A-2014-128066
[Patent Document 2] JP-A-9-215343

SUMMARY OF INVENTION

Problem that the Invention is to Solve

High-speed switching of the power semiconductor element rapidly changes a current flowing in the power semiconductor element. The current change di/dt generates a surge voltage L×di/dt between both ends of the power semiconductor element due to a parasitic inductance L of a conductive path between the power semiconductor element and a voltage source. An excessive surge voltage may destroy the power semiconductor element, and in order to protect the power semiconductor element, a snubber circuit that absorbs the surge voltage may be added to the power semiconductor module.

The snubber circuit of the power semiconductor module described in Patent Document 1 is bridged between the positive DC input terminal and the negative DC input terminal provided on the one side surface of the power semiconductor module, and is disposed beside the power semiconductor module. Therefore, an area required for installation of the power semiconductor module is increased, which hinders size reduction of the induction heating power supply device. Although the snubber circuit disclosed in Patent Document 1 is a collective snubber provided collectively to two power semiconductor elements included in the power semiconductor module, there exists individual snubbers provided to each power semiconductor element other than a simple collective snubber. In a case of the individual snubbers, one snubber circuit is bridged between the positive DC input terminal and the output terminal, the other snubber circuit is bridged between the negative DC input terminal and the output terminal, and these two snubber circuits are arranged so as to surround an outer periphery of the module along a side surface of the power semiconductor module. In this case, the area required for installation of the power semiconductor module is further increased.

The snubber circuit of the power semiconductor module described in Patent Document 2 is disposed on an upper surface of the power semiconductor module. However, the circuit board is disposed in a state laid down with respect to the upper surface of the power semiconductor module, and electronic components such as a resistor, a capacitor, and a diode constituting the snubber circuit are mounted on only one surface of the circuit board. Although Patent Document 2 does not disclose whether the snubber circuit is a collective snubber or individual snubbers, electronic components for two circuits, including a snubber circuit bridged between the positive DC input terminal and the output terminal and a snubber circuit bridged between the negative DC input terminal and the output terminal, are mounted in a case of individual snubbers. In this case, the board area required for mounting the electronic components for two circuits is provided by only one surface of the circuit board, and the circuit board may protrude to a side of the power semiconductor module beyond an edge of the upper surface of the power semiconductor module, which may increase the area required for installation of the power semiconductor module.

The present invention has been made in view of the above circumstances, and an object thereof is to provide a snubber circuit that is suitable for a power semiconductor module whose upper surface is provided with a positive DC input terminal, a negative DC input terminal, and an output terminal, and is advantageous for size reduction of an induction heating power supply device.

Means for Solving the Problem

A snubber circuit according to an aspect of the present invention is a snubber circuit for a power semiconductor module including an arm formed by connecting two power semiconductor elements capable of switching in series, the power semiconductor module including a positive DC input terminal, a negative DC input terminal, and an output terminal which are electrically connected to the arm, the positive DC input terminal, the negative DC input terminal, and the output terminal being provided on an upper surface opposite to an installation surface of the power semiconductor module, the snubber circuit including: a circuit board; and a plurality of electronic components mounted on the circuit board, in which the circuit board includes: a bare board erected with respect to the upper surface of the power semiconductor module; a conductor layer provided on at least one surface of a front surface and a rear surface of the bare board, and forming a first circuit pattern bridged between the positive DC input terminal and the output terminal, and a second circuit pattern bridged between the negative DC input terminal and the output terminal; and plurality of connection terminals connecting the conductor layer to the positive DC input terminal, the negative DC input terminal, and the output terminal.

A power semiconductor module according to an aspect of the present invention is a power semiconductor module including an arm formed by connecting two power semiconductor elements capable of switching in series, the power semiconductor module including: a positive DC input terminal, a negative DC input terminal, and an output terminal which are electrically connected to the arm; and a snubber circuit connected to the positive DC input terminal, the negative DC input terminal, and the output terminal, in which the positive DC input terminal, the negative DC input terminal, and the output terminal are provided on an upper surface opposite to an installation surface of the power semiconductor module, in which the snubber circuit includes: a circuit board; and a plurality of electronic components mounted on the circuit board, and in which the circuit board includes: a bare board erected with respect to the upper surface of the power semiconductor module; a conductor layer provided on at least one surface of a front surface and a rear surface of the bare board, and forming a first circuit pattern bridged between the positive DC input terminal and the output terminal, and a second circuit pattern bridged between the negative DC input terminal and the output terminal; and plurality of connection terminals connecting the conductor layer to the positive DC input terminal, the negative DC input terminal, and the output terminal.

An induction heating power supply device according to an aspect of the present invention includes an inverter unit configured to convert DC power into AC power, in which the inverter unit is configured with a bridge including a plurality of the above-described power semiconductor modules.

Advantageous Effect of the Invention

According to the present invention, it is possible to provide a snubber circuit that is suitable for a power semiconductor module whose upper surface is provided with a positive DC input terminal, a negative DC input terminal, and an output terminal, and is advantageous for size reduction of an induction heating power supply device.

BRIEF DESCRIPTION OF DRAWINGS

FIG. 1 is a circuit diagram of an example of an induction heating power supply device for describing an embodiment.

FIG. 2 is a perspective view showing a configuration example of a power semiconductor module used in an inverter unit of the induction heating power supply device of FIG. 1.

FIG. 3 is a perspective view of a first modification of the snubber circuit of FIG. 2.

FIG. 4 is a perspective view of a second modification of the snubber circuit of FIG. 2.

FIG. 5 is a perspective view of another example of a snubber circuit for describing an embodiment.

FIG. 6 is a perspective view on a rear surface side of the snubber circuit of FIG. 5.

FIG. 7 is a cross-sectional view taken along line VII-VII in FIG. 6.

MODE FOR CARRYING OUT THE INVENTION

FIG. 1 shows an example of an induction heating power supply device for describing an embodiment of the present invention.

The induction heating power supply device 1 shown in FIG. 1 includes: a DC power supply unit 4 including a converter unit 3 that converts AC power supplied from a commercial AC power supply 2 into DC power; a smoothing unit 5 that smoothes a pulsating flow of the DC power output from the DC power supply unit 4; and an inverter unit 6 that reversely converts the DC power smoothed by the smoothing unit 5 into high-frequency AC power.

The inverter unit 6 is configured with a full bridge circuit including: a first arm including two power semiconductor elements Q1, Q2 connected in series; and a second arm including two power semiconductor elements Q3, Q4 connected in series. The first arm and the second arm are connected in parallel to the smoothing unit 5. A series connection point P1 of the power semiconductor elements Q1, Q2 of the first arm and a series connection point P2 of the power semiconductor elements Q3, Q4 of the second arm serve as output ends of the full bridge circuit. A heating coil 7 is connected between the series connection points P1 and P2 via a transformer 8. A reflux diode is reversely connected in parallel in each power semiconductor element.

Examples of the power semiconductor element include various power semiconductor elements capable of switching such as an insulated gate bipolar transistor (IGBT) and a metal-oxide-semiconductor field-effect transistor (MOSFET), and examples of a semiconductor material include silicon (Si) and silicon carbide (SiC).

In the first arm and the second arm, with a side connected to a positive side of the smoothing unit 5 defined as a high side, and with a side connected to a negative side of the smoothing unit 5 defined as a low side, the power semiconductor element Q1 on the high side of the first arm and the power semiconductor element Q4 on the low side of the second arm are turned on and off in synchronization, and the power semiconductor element Q2 on the low side of the first arm and the power semiconductor element Q3 on the high side of the second arm are turned on and off in synchronization. The power semiconductor elements Q1, Q4 and the power semiconductor elements Q2, Q3 are turned on alternately, thereby supplying high frequency power to the heating coil 7.

High-speed switching of the power semiconductor elements Q1 to Q4 rapidly changes the current flowing through the power semiconductor elements Q1 to Q4, and generates surge voltages between both ends of the power semiconductor elements Q1 to Q4 due to a parasitic inductance of a conductive path between the power semiconductor elements Q1 to Q4 and the smoothing unit 5 as a voltage source. In order to absorb the surge voltages, snubber circuits SC1 to SC4 are individually provided in the power semiconductor elements Q1 to Q4.

The snubber circuits SC1 to SC4 are so-called discharge blocking RCD snubber circuits each including a resistor R, a capacitor C, and a diode D in the illustrated example.

In the snubber circuit SC1 of the power semiconductor element Q1 on the high side of the first arm, the capacitor C and the diode D are connected in series between both ends of the power semiconductor element Q1 (between a collector and an emitter in IGBT and between a drain and a source in MOSFET), and the resistor R is connected between a series connection point of the capacitor C and the diode D and the negative side of the smoothing unit 5. In the snubber circuit SC2 of the power semiconductor element Q2 on the low side of the first arm, the capacitor C and the diode D are connected in series between both ends of the power semiconductor element Q2, and the resistor R is connected between a series connection point of the capacitor C and the diode D and the positive side of the smoothing unit 5. The snubber circuit SC3 of the power semiconductor element Q3 on the high side of the second arm is configured similarly to the snubber circuit SC1, and the snubber circuit SC4 of the power semiconductor element Q4 on the low side of the second arm is configured similarly to the snubber circuit SC2.

The snubber circuits SC1 to SC4 are not limited to the above configuration, and, for example, may have an arrangement of the capacitor C and the diode D with respect to the power semiconductor elements that is reversed from the illustrated example, may be a so-called charge/discharge type RCD snubber circuit in which the resistor R is connected in parallel with the diode D, or may be a so-called RC snubber circuit in which the resistor R and the capacitor C are connected in series between both ends of the power semiconductor elements. Although the capacitor C may be a single capacitor, a plurality of capacitors are preferably connected in parallel from a viewpoint of reducing the inductance. The capacitor C may be a film capacitor, but is preferably a ceramic capacitor from a viewpoint of reducing the inductance. The diode D may be a SiC diode, but is preferably a Si diode having a large surge current tolerance.

The power semiconductor elements Q1, Q2 of the first arm and their reflux diodes are housed in a case and modularized, and the snubber circuits SC1, SC2 are connected to an external connection terminal provided in a manner exposed to an outside of the case, and are disposed outside the case. In some cases, the power semiconductor elements Q1, Q2 and the case in which the reflux diodes are housed are filled with a molding resin, so as to seal the power semiconductor elements Q1, Q2 and their reflux diodes. Similarly, the power semiconductor elements Q3, Q4 of the second arm and their reflux diodes are housed in a case and modularized, and the snubber circuits SC3, SC4 are connected to an external connection terminal provided in a manner exposed to an outside of the case, and are disposed outside the case.

The power semiconductor module including the power semiconductor elements Q1, Q2 of the first arm and the power semiconductor module including the power semiconductor elements Q3, Q4 of the second arm have identical configurations, and the power semiconductor module including the power semiconductor elements Q1, Q2 of the first arm and the snubber circuits SC1, SC2 of the power semiconductor elements Q1, Q2 will be described in the following with reference to FIG. 2.

FIG. 2 shows a configuration example of the power semiconductor modules and the snubber circuits.

A power semiconductor module 10 includes a positive DC input terminal 11, a negative DC input terminal 12, and an output terminal 13 as external connection terminals. The positive DC input terminal 11, the negative DC input terminal 12, and the output terminal 13 are provided in a manner exposed to the outside of the case 14 that houses the power semiconductor elements Q1, Q2 and their reflux diodes. The case 14 is formed in a substantially rectangular parallelepiped shape, and has an installation surface installed on a heat sink or the like (not shown). The positive DC input terminal 11, the negative DC input terminal 12, and the output terminal 13 are arranged on an upper surface 14a on a side opposite to the installation surface of the case 14, and, in the example shown in FIG. 2, are arranged beside one another at appropriate intervals on a straight line in parallel to a long side of the upper surface 14a and substantially passing through a center of a short side of the upper surface 14a.

The positive DC input terminal 11 is electrically connected to an end on the power semiconductor element Q1 side of the first arm including the power semiconductor elements Q1, Q2; the negative DC input terminal 12 is electrically connected to an end on the power semiconductor element Q2 side of the first arm; and the output terminal 13 is electrically connected to the series connection point P1 (see FIG. 1) of the power semiconductor elements Q1, Q2, which is the output terminal end of the first arm. The positive DC input terminal 11 is connected to the positive side of the smoothing unit 5 using a wiring member such as a bus bar, and the negative DC input terminal 12 is connected to the negative side of the smoothing unit 5 using a wiring member. The output terminal 13 is connected to the transformer 8 (see FIG. 1) using a wiring member, and is connected to one end of the heating coil 7 (see FIG. 1) via the transformer 8.

Each of the snubber circuits SC1, SC2 of the power semiconductor elements Q1, Q2 includes the resistor R, the capacitor C, and the diode D as described above, and are configured with a circuit board 20 on which the electronic components R, C, and D for the two circuits including the snubber circuits SC1, SC2 are mounted. The circuit board 20 includes a bare board 21, a conductor layer 22, and connection terminals 23, 24, 25.

Examples of the bare board 21 include various materials such as bakelite, a paper phenol made by hardening paper with a phenolic resin, and a glass epoxy made by hardening glass fiber with an epoxy resin, with a material having a flexural rigidity per unit thickness higher than copper preferred. Among the materials exemplified above, glass epoxy is preferable. The bare board 21 is erected substantially perpendicular with respect to the upper surface 14a of the case 14.

The conductor layer 22 is typically formed of a copper foil, and in the example shown in FIG. 2, is provided on one surface 21a of a front surface and a rear surface of the bare board 21. The conductor layer 22 forms a first circuit pattern 26 bridged between the positive DC input terminal 11 and the output terminal 13, and a second circuit pattern 27 extending between the negative DC input terminal 12 and the output terminal 13. The electronic components R, C, and D constituting the snubber circuit SC1 of the power semiconductor element Q1 are respectively attached to appropriate portions of the first circuit pattern 26. Similarly, the electronic components R, C, and D constituting the snubber circuit SC2 of the power semiconductor element Q2 are respectively attached to appropriate portions of the second circuit pattern 27. From a viewpoint of reducing the inductance of the snubber circuits SC1, SC2, a thickness of the conductor layer 22 is preferably 0.2 mm or more. Considering soldering workability of the electronic components R, C, and D, the thickness of the conductor layer 22 is preferably 2.0 mm or less.

A land 28 electrically connected to the positive DC input terminal 11 is provided on the first circuit pattern 26, and a land 29 electrically connected to the negative DC input terminal 12 is provided on the second circuit pattern 27. and a land 30 electrically connected to the output terminal 13 is provided on both the first circuit pattern 26 and the second circuit pattern 27. These lands 28, 29, 30 are arranged close to the upper surface 14a of the case 14 and at a lower edge portion of the bare board 21 disposed.

The connection terminals 23, 24, 25 are made of a metal material such as copper, and are formed into an L-shape. For example, one end of the connection terminal 23 is soldered to the land 28, and the connection terminal 23 is fixed to the bare board 21 in a state of being electrically connected to the first circuit pattern 26. Similarly, the connection terminal 24 is fixed to the bare board 21 in a state of being electrically connected to the second circuit pattern 27 via the land 29, and the connection terminal 25 is fixed to the bare board 21 in a state of being electrically connected to the first circuit pattern 26 and the second circuit pattern 27 via the land 30.

The other end of the connection terminal 23 is screwed to the positive DC input terminal 11, the other end of the connection terminal 24 is screwed to the negative DC input terminal 12, and the other end of the connection terminal 25 is screwed to the output terminal 13. The bare board 21 is supported by these three connection terminals 23, 24, 25 in a state erected with respect to the upper surface 14a of the case 14. The first circuit pattern 26 is electrically connected to the positive DC input terminal 11 via the connection terminal 23, and is electrically connected to the output terminal 13 via the connection terminal 25. The second circuit pattern 27 is electrically connected to the negative DC input terminal 12 via the connection terminal 24, and is electrically connected to the output terminal 13 via the connection terminal 25.

According to the power semiconductor module 10 described above, the surge voltages generated between both ends of the power semiconductor elements Q1, Q2 in accordance with switching of the power semiconductor elements Q1, Q2 are absorbed by the snubber circuits SC1, SC2 individually provided in the power semiconductor elements Q1, Q2, respectively. As a result, destruction of the power semiconductor elements Q1, Q2 due to the surge voltages can be prevented.

The circuit board 20 constituting the snubber circuits SC1, SC2 is erected with respect to the upper surface 14a of the case 14 of the power semiconductor module 10, and by extending the circuit board 20 in a normal direction of the upper surface 14a, it is possible to secure a board area required for mounting the electronic components R, C, and D for the two circuits including the snubber circuits SC1, SC2 without changing an area required for installing the power semiconductor module 10. As a result, size reduction of the induction heating power supply device 1 can be achieved. Further, since the board area can be easily secured, restriction to component sizes of the electronic components R, C, and D is relaxed, and the surge voltage can be effectively absorbed by using electronic components R, C, and D having appropriate constants.

The electronic components R, C, and D of the snubber circuits SC1, SC2 are preferably mounted on the circuit board 20 in an exposed state as shown in FIG. 2. As a result, the electronic components R, C, and D can be easily changed. For example, with respect to design change of the inverter unit 6, that is, change of a switching frequency of the power semiconductor elements Q1, Q2, by generally using the circuit board 20 and using electronic components R, C, and D having appropriate constants, the surge voltage can be absorbed effectively. Further, since the electronic components R, C, and D are mounted on the circuit board 20 in an exposed state, the electronic components R, C, and D have excellent heat dissipation, and deterioration of the electronic components R, C, and D due to heat can be prevented, thereby improving durability of the snubber circuits SC1, SC2.

FIGS. 3 and 4 show a modification of the snubber circuits SC1, SC2.

In the example shown in FIGS. 3 and 4, conductor layers are provided on both surfaces of the bare board 21 including the front surface 21a and the rear surface 21b. A conductor layer 22a provided on the front surface 21a forms the first circuit pattern 26, and the electronic components R, C, and D are attached to appropriate portions of the first circuit pattern 26, respectively, so as to constitute the snubber circuit SC1. A conductor layer 22b provided on the rear surface 21b forms the second circuit pattern 27, and the electronic components R, C, and D are attached to appropriate portions of the second circuit pattern 27, respectively, so as to constitute the snubber circuit SC2. The lands 29, 30 are provided on the front surface 21a, and the lands 29, 30 and the second circuit pattern 27 on the rear surface 21b side are, for example, connected to each other via through holes penetrating the bare board 21.

Thus, the circuit board 20 erected with respect to the upper surface 14a of the case 14 of the power semiconductor module 10 can be effectively used for mounting the electronic components R, C, and D on both the front and the rear surfaces thereof. Therefore, by providing the conductor layers 22a and 22b and the electronic components R, C, and D on both surfaces of the bare board 21 including the front surface 21a and the rear surface 21b, size reduction of the circuit board 20 and further size reduction of the induction heating power supply device 1 can be achieved.

By forming the first circuit pattern 26 of the snubber circuit SC1 on the front surface 21a of the bare board 21, and forming the second circuit pattern 27 of the snubber circuit SC2 on the rear surface 21b, a conduction path length of the first circuit pattern 26 is reduced as much as possible between the positive DC input terminal 11 and the output terminal 13, and a conductive path length of the second circuit pattern 27 is reduced as much as possible between the negative DC input terminal 12 and the output terminal 13, thereby reducing the inductance of the snubber circuits SC1, SC2. As a result, the surge voltages generated at both ends of the power semiconductor elements Q1, Q2 can be prevented.

FIGS. 5 to 7 show another example of a snubber circuit for explaining an embodiment of the present invention.

The snubber circuits shown in FIGS. 5 to 7 are the snubber circuits SC1, SC2 individually provided in the power semiconductor elements Q1, Q2. A positive DC input terminal 111, a negative DC input terminal 112, and an output terminal 113 are arranged on an upper surface 114a of a case 114 of a power semiconductor module 110 including the power semiconductor elements Q1, Q2. Each of the snubber circuits SC1, SC2 includes the resistor R, the capacitor C, and the diode D as described above, and are configured with a circuit board 120 on which the electronic components R, C, and D for the two circuits including the snubber circuits SC1, SC2 are mounted. The circuit board 120 includes a bare board 121, a conductor layer 122a provided on a front surface 121a of the bare board 121, a conductor layer 122b provided on a rear surface 121b of the bare board 121, and connection terminals 123, 124, 125.

The conductor layer 122a forms the first circuit pattern 126, and the electronic components R, C, and D are attached to appropriate portions of the first circuit pattern 126, respectively, so as to constitute the snubber circuit SC1. The conductor layer 122b forms the second circuit pattern 127, and the electronic components R, C, and D are attached to appropriate portions of the second circuit pattern 127, respectively, so as to constitute the snubber circuit SC2.

The connection terminals 123, 124, 125 are formed into an L-shape. The connection terminal 123 is connected to the positive DC input terminal 111, the connection terminal 124 is connected to the negative DC input terminal 112, and the connection terminal 125 is connected to the output terminal 113. The bare board 121 is supported by these three connection terminals 123, 124, 125 so as to be erected with respect to the upper surface 114a of the case 114. The first circuit pattern 126 is electrically connected to the positive DC input terminal 111 via the connection terminal 123, and is electrically connected to the output terminal 113 via the connection terminal 125. The second circuit pattern 127 is electrically connected to the negative DC input terminal 112 via the connection terminal 124, and is electrically connected to the output terminal 113 via the connection terminal 125.

The bare board 121 includes a pair of insulating substrates 140, 141 and conductive substrates 143, 144, 145 sandwiched between the pair of insulating substrates 140, 141. The conductive substrates 143, 144, 145 are insulated from each other. The insulating substrates 140 and 141 are, for example, bakelite, paper phenol, glass epoxy, or the like, and the conductive substrates 143, 144, 145 are, for example, copper plates.

The conductive substrate 143 has an extended portion 146 protruding downward from a lower surface of the bare board 121 disposed to face the upper surface 114a of the case 114, and similarly, the conductive substrate 144 has an extended portion 147, and the conductive substrate 145 has an extended portion 148. The extension portions 146, 147, 148 are bent into an L-shape, and the connection terminals 123, 124, 125 are configured with the extended portions 146, 147, 148. The first circuit pattern 126 on the front surface 121a side of the bare board 121 is connected to the conductive substrate 143 via a through hole H1 penetrating the bare board 121, and is connected to the conductive substrate 145 via a through hole H3. The second circuit pattern 127 on the rear surface 121b side of the bare board 121 is connected to the conductive substrate 144 via a through hole H2 penetrating the bare board 121, and is connected to the conductive substrate 145 via the through hole H3. In this way, the connection terminals 123, 124, 125 may be formed integrally with the bare board 121.

According to the snubber circuit shown in FIGS. 5 to 7, similarly to the snubber circuit shown in FIG. 3 and FIG. 4, the circuit board 120 erected with respect to the upper surface 114a of the case 114 of the power semiconductor module 110 can be effectively used for mounting the electronic components R, C, and D on both the front and the rear surfaces thereof, thereby achieving size reduction of the circuit board 120. By forming the first circuit pattern 126 of the snubber circuit SC1 on the front surface 121a of the bare board 121, and forming the second circuit pattern 127 of the snubber circuit SC2 on the rear surface 121b, a conduction path length of the first circuit pattern 126 is reduced as much as possible between the positive DC input terminal 111 and the output terminal 113, and a conductive path length of the second circuit pattern 127 is reduced as much as possible between the negative DC input terminal 112 and the output terminal 113, thereby reducing a floating inductance of the snubber circuits SC1, SC2. Further, by integrally forming the connection terminals 123, 124, 125 with the bare board 121, the number of components can be reduced.

This application claims priority to Japanese Patent Application No. 2018-170803 filed on Sep. 12, 2018, the entire content of which is incorporated herein by reference.

The invention claimed is:

1. A snubber circuit unit for a power semiconductor module including an arm having two power semiconductor elements capable of switching which are connected in series, the power semiconductor module including a positive DC input terminal, a negative DC input terminal, and an output terminal which are electrically connected to the arm, the positive DC input terminal, the negative DC input terminal, and the output terminal being provided on an upper surface opposite to an installation surface of the power semiconductor module, the snubber circuit unit comprising:
 a circuit board; and
 a plurality of electronic components mounted on the circuit board,
 wherein the circuit board includes:
  a bare board erected with respect to the upper surface of the power semiconductor module;
  a conductor layer provided on at least one surface of a front surface and a rear surface of the bare board, and forming a first circuit pattern between the positive DC input terminal and the output terminal, and a second circuit pattern between the negative DC input terminal and the output terminal; and
  a plurality of connection terminals connecting the conductor layer to the positive DC input terminal, the negative DC input terminal, and the output terminal,
 wherein the bare board includes:
  a pair of insulating substrates; and
  a plurality of conductive substrates sandwiched between the pair of insulating substrates in a state insulated from one another and connected to the conductor layer respectively via a through hole,
 wherein each of the plurality of conductive substrates includes an extended portion protruding from one side surface of the bare board, and
 wherein the plurality of connection terminals are respectively formed by the extended portions of the plurality of conductive substrates.

2. The snubber circuit unit according to claim 1, wherein the conductor layer and the plurality of electronic components are provided on the front surface and the rear surface of the bare board.

3. The snubber circuit unit according to claim 2, wherein the first circuit pattern and electronic components connected to the first circuit pattern among the plurality of electronic components are provided on the front surface of the bare board, and wherein the second circuit pattern and electronic components connected to the second circuit pattern among the plurality of electronic components are provided on the rear surface of the bare board.

4. The snubber circuit unit according to claim 1, wherein the plurality of electronic components are mounted on the circuit board in an exposed state.

5. The snubber circuit unit according to claim 1, wherein the plurality of electronic components includes a diode, and wherein the diode is a silicon diode or a silicon carbide diode.

6. The snubber circuit unit according to claim 1, wherein the conductor layer has a thickness of 0.2 mm or more and 2 mm or less.

7. A power semiconductor module including an arm formed by connecting two power semiconductor elements capable of switching in series, the power semiconductor module comprising:
 a positive DC input terminal, a negative DC input terminal, and an output terminal which are electrically connected to the arm; and a snubber circuit unit connected to the positive DC input terminal, the negative DC input terminal, and the output terminal, wherein the positive DC input terminal, the negative DC input terminal, and the output terminal are provided on an upper surface opposite to an installation surface of the power semiconductor module, wherein the snubber circuit unit includes:
  a circuit board; and
  a plurality of electronic components mounted on the circuit board, wherein the circuit board includes:
  a bare board erected with respect to the upper surface of the power semiconductor module;
  a conductor layer provided on at least one surface of a front surface and a rear surface of the bare board, and forming a first circuit pattern bridged between the positive DC input terminal and the output terminal, and a second circuit pattern bridged between the negative DC input terminal and the output terminal; and
  a plurality of connection terminals connecting the conductor layer to the positive DC input terminal, the negative DC input terminal, and the output terminal, wherein the bare board includes:
  a pair of insulating substrates; and
  a plurality of conductive substrates sandwiched between the pair of insulating substrates in a state insulated from one another and connected to the conductor layer respectively via a through hole, wherein each of the plurality of conductive substrates includes an extended portion protruding from one side surface of the bare board, and wherein the plurality of connection terminals are respectively formed by the extended portions of the plurality of conductive substrates.

8. An induction heating power supply device comprising:
an inverter unit configured to convert DC power into AC power,
wherein the inverter unit is configured with a bridge including a plurality of the power semiconductor modules according to claim 7.

* * * * *